//patents...

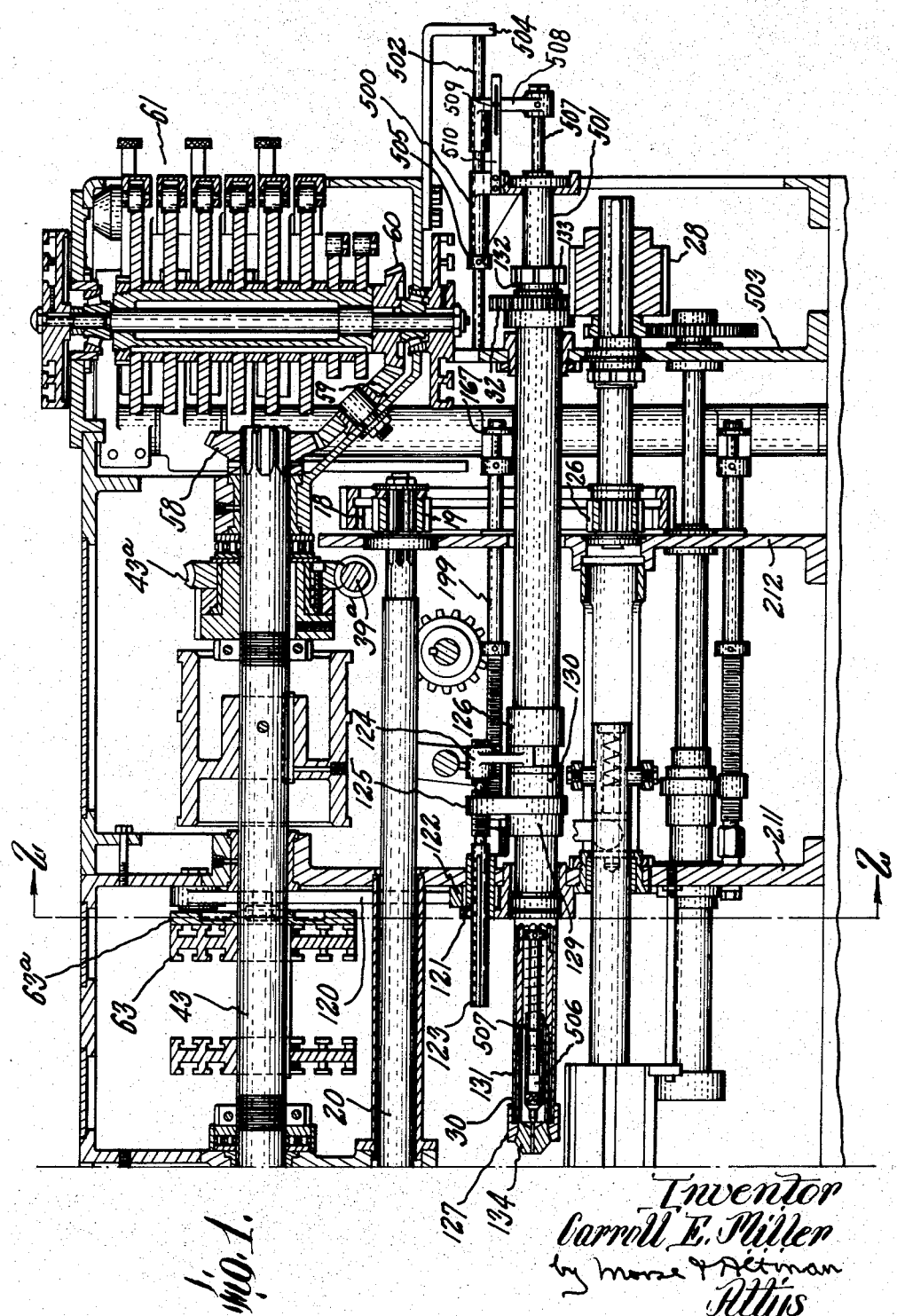

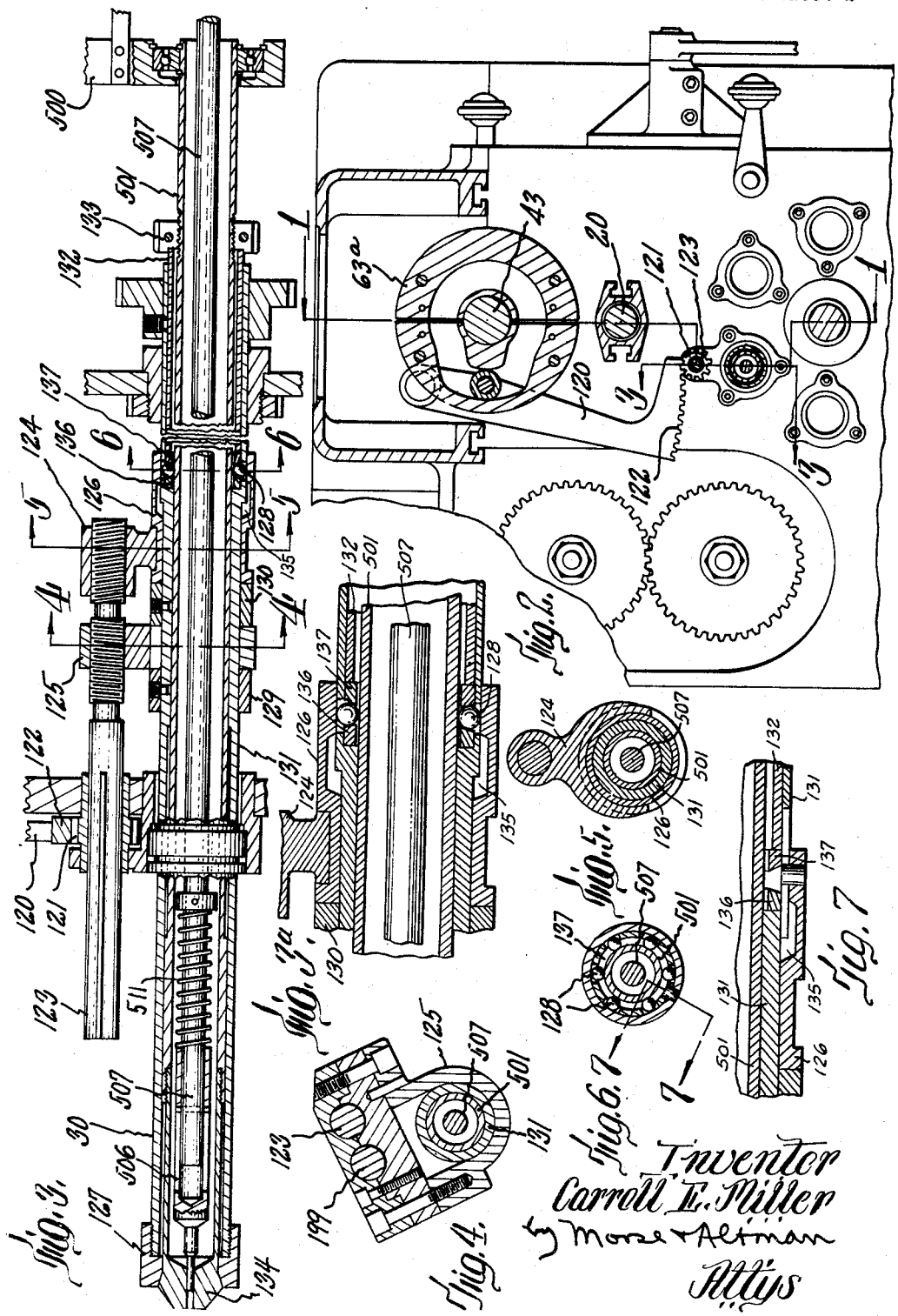

United States Patent Office 2,937,030
Patented May 17, 1960

2,937,030

PICK-OFF SPINDLE CHUCKING MECHANISM

Carroll E. Miller, Windsor, Vt., assignor to Cone Automatic Machine Company, Inc., Windsor, Vt., a corporation of Vermont Application September 11, 1957, Serial No. 683,356

6 Claims. (Cl. 279—75)

This application is a continuation, in part, of my copending applications Serial No. 545,297, filed November 7, 1955, for "Multiple Spindle Lathe," and Serial No. 569,849, filed March 6, 1956, now abandoned, for "Chucking Mechanism." The invention relates to chucking mechanism for a pick-off spindle in an automatic multi-spindle lathe. When the end portion of a bar of stock gripped by the chuck of a work-spindle has been operated on and the work-piece is being cut off, the pick-off spindle is shifted axially to move its chuck over the work-piece. This chuck is then closed to grip the work-piece just before it is cut off from the bar of stock. An object of the present invention is to provide closed-chuck locking mechanism which operates independently of any axial movement of the spindle as a whole to avoid any movement strain which could influence or disturb the chuck position on the work-piece. Another object of the invention is to utilize a rotary movement to rotate right- and left-hand screws so as to prevent the applied forces from exerting any pressure on the pick-off spindle which could tend to move the chuck relatively to the work-piece.

For a more complete understanding of the invention reference may be had to the following description thereof, and to the drawings, of which:

Figure 1 is a partial sectional view of an automatic lathe showing the mechanism embodying the present invention, the section being taken on the line 1—1 of Figure 2;

Figure 2 is a section on the line 2—2 of Figure 1;

Figure 3 is a sectional view, on a larger scale, of the pick-off spindle shown in Figure 1, the section being taken on the line 3—3 of Figure 2;

Figure 3a is a fragmentary longitudinal section of the locking portion of the pick-off spindle shown in Figure 3, but on a larger scale;

Figures 4, 5 and 6 are sections on the lines 4—4, 5—5, and 6—6, respectively, of Figure 3, and Figure 7 is a section on the line 7—7 of Figure 6.

The drawings illustrate portions of an automatic multi-spindle lathe having the usual housing with transverse frame members 211, 212, and 503 having bearings for shafts and spindles as hereinafter described. Two constantly driven shafts 20 and 43 are shown, the former driving a pick-off spindle 30 through a gear train 19, 18, 26, 28, 32. The shaft 43 is driven through a worm 39a and gear 43a connection and, in turn, has a driving connection through gears 58, 59, 60 with a cam cluster generally indicated at 61. This cluster controls the operation of various tools (not shown) which operate on the work. The shaft 43 also operates other members including a cam holder 63 on which is mounted a cam 63a.

The pick-off spindle 30 comprises a collet tube 501 on an end of which is a collet 134, a chucking tube 131 on an end of which is a chucking head 127 which operates on the collet 134 when the tubes are relatively moved axially, and a locking tube 132 which at one end abuts a split nut 133 adjustably mounted on the collet tube 501. Within the spindle is an ejector rod 507 arranged to push an ejector 506 to dislodge a work-piece from the chuck as hereinafter described.

To advance the pick-off spindle to cover and grip a work-piece, one of the cams in the cluster 61 rocks an arm 167 to advance a rod 199 which is adjustably secured to a bracket 125. This bracket embraces the pick-off spindle which rotates therein, but relative axial movement is prevented by two collars 129, 130 fixed on the chucking tube 131 on either side of the bracket. Thus, forward movement of the rod 199 results in similar movement of the chucking tube.

Mounted at the rear end of the collet tube 501 is a bearing carrying a bracket 500 which moves axially with the collet tube but does not revolve. The bracket 500 has a portion slidable on rod 502 the ends of which are mounted on the frame member 503 and an outboard support 504 respectively. When the spindle is advanced to cover a work-piece, the collet tube 501 goes with the chucking tube 131 until the bracket 500 brings up against a stop collar 505 adjustably secured on the rod 502. Further advance of the chucking tube 131 is relative with respect to the stopped collet tube and results in a closing of the collet on the work-piece.

According to the invention, means are now operated to lock the chuck in gripping position so that the spindle as a whole can be shifted without relaxing the grip on the work-piece. To this end the cam 63a operates at the proper moment to rock an arm 120 which has a rack 122 at the end thereof. The rack rotates a pinion 121 which is splined on a shaft 123 as illustrated in Figure 1 so that it can move axially. The shaft 123 has two portions which are oppositely screw-threaded, one portion being in threaded engagement with the bracket 125, the other portion being in threaded engagement with a fork 124 which engages in a circumferential groove in a locking cam sleeve 126 slidably fitted on a portion of the chucking tube 131. This sleeve has an inner circumferential groove 135 with sloping side walls (Figure 7) to receive a number of balls 128 which are distributed around the collet tube 501 between two chamfered wedge rings 136, 137. The ring 136 abuts a shoulder within the chuck tube 131. The ring 137 abuts an end of the locking tube 132, the other end of which tube abuts the split nut 133, this nut forming a shoulder facing the shoulder within the chuck tube. As soon as the chuck tube 131 has moved forward on the collet tube 501 to close the chuck on the work, the shaft 123 is rotated as described to move the locking sleeve forward so as to cam the balls 128 radially inward between the wedging rings 136, 137, this being the position illustrated in Figure 1. The split nut 133 has been previously adjusted on the tube 501 so that the wedge rings, balls and tube 132 tightly lock the chuck tube 131 against any movement toward the rear with respect to the collet tube 501. The assembly, however, can readily be retracted, the shaft 123 having a sliding connection with the pinion 121.

When the time comes for the release of the work-piece, the cam 63a rocks the rack arm 120 in the opposite direction, shifting the locking sleeve toward the rear to bring the groove 135 around the balls 128 so that the latter can move radially outward to permit retraction of the chuck tube 131 on the collet tube 501, releasing the work-piece.

Within the collet tube 501 is an ejector rod 507 which is axially adjustable with respect to the tube 501 but which in operation moves therewith. For this purpose a bracket 508 on the outer end of the rod 507 has a portion sliding on the rod 502 and is adjustably secured by a screw 509 to a slotted member 510 projecting from the bracket 500. When the collet 134 moves over a work-piece, the latter pushes a sleeve 506 on the inner end of the rod 507 to compress a spring 511 carried by the rod 507. When the work-piece is later released by the chuck, the spring causes the sleeve 506 to eject the work-piece.

I claim:

1. In an automatic lathe, a pick-off spindle having a collet chuck and two nested tubular members relatively movable axially to close and open said chuck and locking means carried by said spindle and axially movable as a unit therewith, said means including wedge elements radially movable when said chuck is closed to lock and unlock said members against chuck-opening relative movement.

2. In an automatic lathe, a pick-off spindle having a collet chuck and two nested tubular members relatively movable axially to close and open said chuck, and locking means carried by said spindle and axially movable as a unit therewith, said means including a rotatable shaft parallel to the spindle axis and mechanism operable by rotation of said shaft when said chuck is closed to lock and unlock said members against chuck-opening relative movement.

3. In an automatic lathe, a pick-off spindle having a collet chuck and two nested tubular members relatively movable axially to close and open said chuck, and locking means carried by said spindle and axially movable as a unit therewith, said means comprising opposed spaced shoulders on said members arranged to move away from each other when said members move relatively to close said chuck, wedging means between said shoulders operable when said chuck is closed to block any movement of said shoulders toward each other, said wedging means including two rings with opposed chamfered faces flaring radially outward, a series of balls between said faces, a cam sleeve slidable axially to press said balls radially inward between said faces, and automatic means independent of axial movement of said spindle for sliding said sleeve to locking and unlocking positions.

4. Mechanism as in claim 3, said last named means including an arm having a rack at the free end thereof, a pinion meshing with said rack and mounted for rotation about an axis parallel to the axis of said spindle, a shaft extending through said pinion and splined thereto to be rotated thereby; a bracket embracing said spindle, means holding said bracket against linear movement relative to said spindle, a fork straddling said cam sleeve and linearly movable therewith parallel to said spindle, and screw means on said shaft operable by rotation of the shaft to move said bracket and fork toward and away from each other.

5. In a machine tool, a rotatable work-holding spindle having a chuck and two tubular members relatively movable axially to open and close the chuck, said members having spaced mutually opposed annular shoulders, wedging means between said shoulders for locking said members against chuck-opening movement, said wedging means including elements radially movable outward to release said members for chuck-opening relative movement, a sleeve surrounding said wedging means and normally preventing outward movement of said elements, said sleeve having an inner circumferential groove, and means for shifting said sleeve axially to bring said grooves into registry with said elements whereby outward movement of said elements is permitted.

6. In a machine tool, a rotatable work-holding spindle having a chuck and outer and inner tubular members relatively axially movable to open and close the chuck, two spaced collars secured on said outer tubular member, a bracket fitted between said collars and surrounding said outer member whereby said spindle is rotatable but not axially movable with respect to said bracket, a rod secured to said bracket and operable to move the bracket and spindle axially, said tubular members having spaced opposed shoulders thereon, wedging means between said shoulders for locking said members against chuck-opening relative movement, said wedging means including elements movable radially outward to release said member for chuck-opening movement, a sleeve surrounding said wedging means and normally preventing said elements from outward movement, said sleeve having an inner circumferential groove, and means for axially moving said sleeve to bring said groove into registry with said elements for limited outward movement of said elements to permit opening of the chuck, said sleeve-moving means including a member mounted on said sleeve for axial movement but not rotation therewith, and means engaging said bracket and last mentioned member and operable to cause said last mentioned member to move axially relatively to said bracket.

References Cited in the file of this patent

UNITED STATES PATENTS

| | | |
|---|---|---|
| 1,807,265 | Walker | May 26, 1931 |
| 2,459,649 | Jahrl | Jan. 18, 1949 |
| 2,835,497 | Suhner | May 20, 1958 |

FOREIGN PATENTS

| | | |
|---|---|---|
| 465,428 | Canada | May 23, 1950 |